United States Patent Office 3,085,821
Patented Apr. 16, 1963

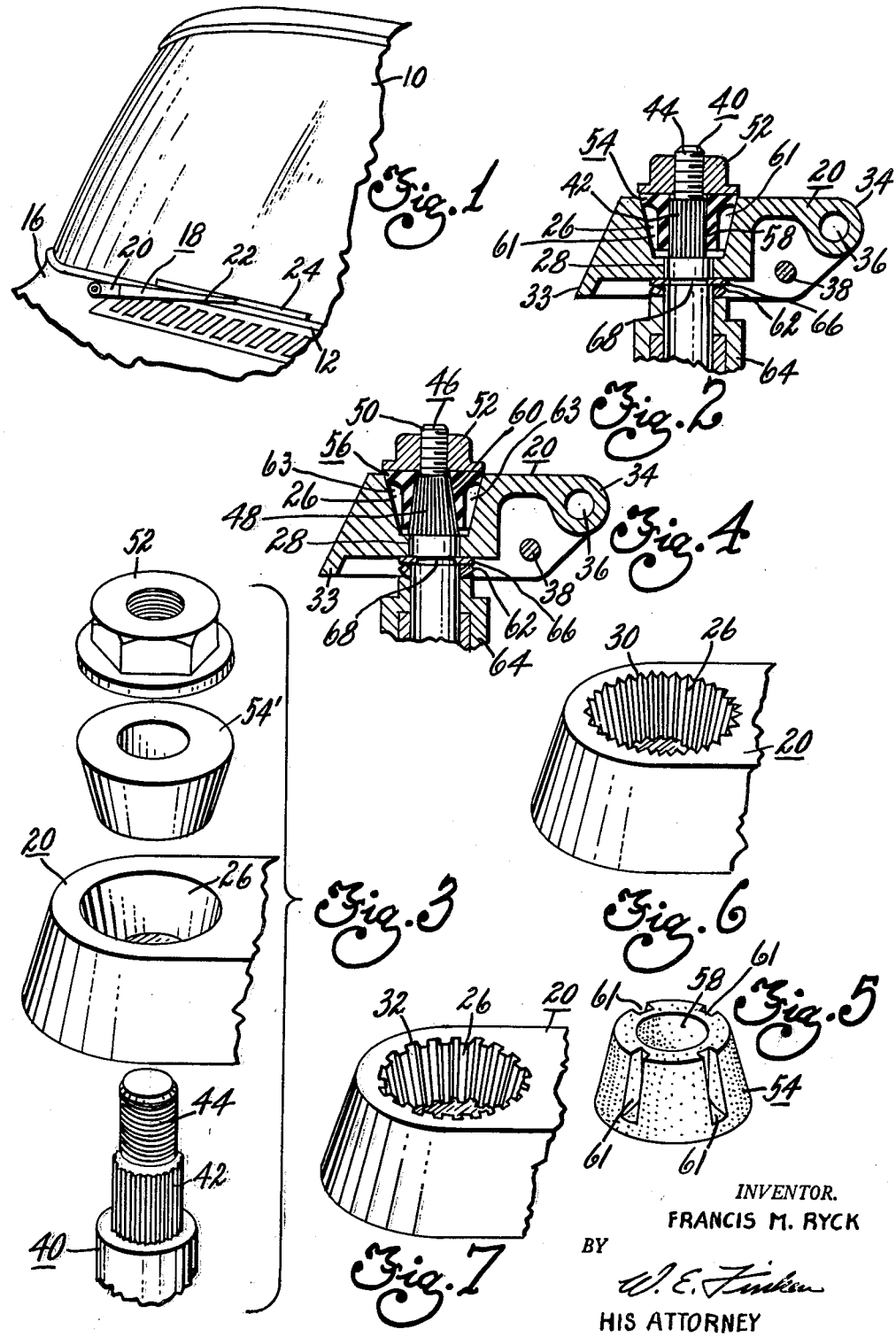

3,085,821
WINDSHIELD WIPER ARM ATTACHMENT
Francis M. Ryck, Rochester, N.Y., assignor to General Motors Corporation, Detroit, Mich., a corporation of Delaware
Filed Apr. 22, 1960, Ser. No. 24,125
10 Claims. (Cl. 287—53)

This invention pertains to windshield wipers, and particularly to improved means for attaching a wiper arm to a wiper shaft permitting infinite angular adjustment therebetween.

In my prior applications Serial Numbers 843,156 filed September 29, 1959 now Patent No. 2,983,532, and 846,-412 now Patent No. 3,051,516 and 846,413 filed October 14, 1959, I disclosed several connections between wiper arms and wiper shafts which permit infinite angular adjustment therebetween to facilitate accurate positioning of the arms and blades against the lower reveal molding when the wipers are not in use. The present invention relates to an improved wiper arm attachment permitting infinite angular adjustment between a wiper arm and a wiper shaft which can be used with conventional threaded end wiper shafts having either a tapered serrated portion or a cylindrical serrated portion. Accordingly, among my objects are the provision of means for attaching a wiper arm to an actuating shaft permitting infinite angular adjustment therebetween; the further provision of means for attaching a wiper arm to a pivot shaft including a frusto conical annulus of deformable elastomeric material; and the still further provision of means for attaching a wiper arm to a pivot shaft including a frusto conical annulus of deformable metal.

The aforementioned and other objects are accomplished in the present invention by wedging the deformable locking member between the serrated portion of the pivot shaft and a frusto conical recess in the arm head. Specifically, the arm head may comprise a die cast metal part having a cylindrical aperture through which a pivot shaft is adapted to extend. The cylindrical aperture is aligned with a frusto conical cored recess in the arm head which may have either smooth side walls or serrated side walls. The arm head includes a radial extension of channel shape which is adapted to be pivotally connected with an outer arm section whereby the outer arm section is supported for movement about an axis transverse to the axis of the pivot shaft under spring pressure for maintaining a wiper blade in engagement with the surface to be wiped.

As alluded to hereinbefore, the improved arm to shaft attachment can be used with a threaded end shaft having either a cylindrical serrated portion or a tapered serrated portion. Moreover, the frusto conical locking member can be composed of either high durometer elastomeric material or soft nonferrous metal. The frusto conical locking member is formed with a cylindrical through bore when used with a pivot shaft having a cylindrical serrated portion and a tapered through bore when used with a shaft having a tapered knurled portion.

In assembling the arm head to the pivot shaft so as to establish a driving connection therebetween, the arm head is placed over the end of the drive shaft in the desired angular position. The locking member is slipped over the shaft into the frusto conical recess of the arm head. Thereafter, a lock nut is tightened on the threaded end of the shaft thereby forcing the locking member into wedging engagement with both the pivot shaft and the arm head.

Further objects and advantages of the present invention will be apparent from the following description, reference being had to the accompanying drawings, wherein a preferred embodiment of the present invention is clearly shown.

In the drawings:

FIGURE 1 is a fragmentary view in elevation of a portion of a vehicle having a wiper arm with the improved attachment means of the present invention.

FIGURE 2 is a view, partly in section and partly in elevation, of one embodiment of the improved wiper arm attachment means shown in conjunction with a pivot shaft having a cylindrical serrated portion.

FIGURE 3 is an exploded fragmentary view depicting the component parts of the arm to shaft attachment means.

FIGURE 4 is a view similar to FIGURE 2 showing the arm attachment means in conjunction with a shaft having a tapered serrated portion.

FIGURE 5 is a bottom plan view of the elastomeric locking member shown in FIGURE 2.

FIGURES 6 and 7 are fragmentary perspective views of a modified arm head construction.

With reference to FIGURE 1, a portion of a vehicle is shown including a windshield 10 having a lower reveal molding 12. A steel pivot shaft extends through the cowl 16 on each side of the vehicle, a wiper arm 18 being drivingly connected to each pivot shaft. The wiper arm 18 includes spring hinge connected inner and outer sections 20 and 22, the outer section of which detachably carries a wiper blade 24 adapted for oscillatory movement across the surface of the windshield 10. When the wiper actuating means are inactivated, the wiper blade 24 is preferably moved to a depressed parked position against the lower reveal molding 12. In order to accurately determine this depressed parked position, the inner arm section, or arm head, 20 is connected to the pivot shaft in a manner permitting infinite angular adjustment relative thereto.

With reference to FIGURE 2, the arm head 20 comprises a die cast metal part having a frusto conical recess 26 in axial alignment with a cylindrical bore 28. The recess 26 is of decreasing diameter inward from the top wall of the arm head. The side walls of the frusto conical recess may be smooth, as depicted in FIGURES 2 and 4, have a diamond knurl 30 as depicted in FIGURE 6 or a straight knurl 32 as depicted in FIGURE 7. The arm head also includes a weather skirt portion 33 and an integral radial extension 34 having a transverse bore 36 therethrough adapted to receive a pin for pivotally interconnecting the arm head 20 with the outer arm section 22. In accordance with conventional practice, the radial extension 34 is of channel shape and has a second pin 38 extending transversely between the side walls thereof to which one end of a pressure applying spring, not shown, can be operatively connected.

The arm head 20 is adapted for use with a pivot, or rock shaft, 40 having a cylindrical serrated portion 42 and a threaded end 44 as shown in FIGURE 2, or a pivot shaft 46 having a tapered serrated portion 48 and a threaded end 50 as shown in FIGURE 4. The threaded ends of the pivot shafts are adapted to receive lock nuts 52. In order to drivingly connect the arm head 20 with its respective pivot shaft, a deformable frusto conical locking member 54, in FIGURE 2, and 56, in FIGURE 4, is wedged between the serrated portion of the pivot shaft and the side walls of the frusto conical recess 26 in the head.

The frusto conical locking member 54 depicted in FIGURE 2 has a cylindrical through bore 58 adapted to drivingly engage the cylindrical serrated portion 42 of the pivot shaft 40. The frusto conical locking member 56, as depicted in FIGURE 4, has a tapered through bore 60 designed to be drivingly interlocked with the tapered serrated portion 48 of the pivot shaft 46.

The frusto conical locking members 54 and 56 may be composed of either durometer elastomeric material such as depicted in FIGURES 2 and 4, or soft nonferrous metal such as depicted by numeral 54' in FIGURE 3. The elastomeric locking member 54 designed for use with a cylindrical serrated shaft 40 is formed with four circumferentially spaced arcuate slots 61 as clearly shown in FIGURE 5. The slots 61 intersect the bottom edge of the locking member, but terminate short of the top edge thereof as depicted in FIGURE 2. The elastomeric locking member 56 also has four arcuate slots 63 as seen in FIGURE 4. The slots 61 and 63 facilitate deformation of the elastomeric locking members 54 and 56 into gripping relation with the serrated portions of the shafts 40 and 46 by their nuts 52 with relatively low nut pressure.

When the lock nut 52 is tightened on the pivot shaft, the locking member is forced into wedging engagement with both the serrated portion of the pivot shaft and the side walls of the frusto conical recess in the arm head. In instances where the lock member is composed of soft nonferrous metal, upon tightening of the lock nut 52 the serrated portions of the pivot shafts will bite into and permanently deform the locking member, as will the serrations in the side walls of the frusto conical recess in the arm head in the embodiments of FIGURES 6 and 7. In instances where the locking member is composed of elastomeric material, the locking member will be deformed to establish a driving connection between the pivot shaft and the arm head.

As seen in FIGURES 2 and 4, in attaching the wiper arm to a pivot shaft, a spring washer 62 is interposed between the end of the transmission housing 64 and a retaining ring 66 is disposed in an annular groove 68 of the pivot shaft. The lower end of the arm head 20 is supported on a retaining ring 66 so that upon tightening of the locking nut 52 the locking member 56 will be forced into the frusto conical recess 26 of the arm head. When the lock nut 52 is removed from the threaded end of the pivot shaft and the locking member 54 is likewise removed from the recess in the arm head, the arm head and its outer blade carrying section can be adjusted to any desired angle relative to the pivot shaft. To lock the arm head for rotation with the pivot shaft, it is only necessary to slip the locking member over the end of the pivot shaft and tighten the locking nut 52.

While the embodiment of the invention as herein disclosed constitutes a preferred form, it is to be understood that other forms might be adopted.

What is claimed is as follows:

1. In a windshield wiper organization, a housing, an actuating shaft journalled in said housing having a threaded end, a serrated portion and an annular groove, a retaining ring disposed in said annular groove, a spring washer disposed between said housing and said retaining ring, a wiper arm head having a through bore adapted to receive the end of said shaft and a frusto conical recess coaxial with said through bore, the bottom of said head being supported by said retaining ring when said arm head is positioned over said shaft, a deformable frusto conical locking annulus disposed in said frusto conical recess and surrounding the serrated portion of said shaft, and means engaging the threaded end of said shaft and said locking annulus for deforming said locking annulus into wedging engagement with said arm head and said shaft and clamping the arm head between said locking annulus and said retaining ring to drivingly interconnect said arm head and said shaft.

2. The windshield wiper organization set forth in claim 1 wherein said locking annulus is composed of elastomeric material.

3. The windshield wiper organization set forth in claim 1 wherein said locking annulus is composed of relatively soft nonferrous metal.

4. The windshield wiper organization set forth in claim 1 wherein the serrated portion of said shaft is cylindrical.

5. The windshield wiper organization set forth in claim 1 wherein the serrated portion of said shaft is tapered.

6. The windshield wiper organization set forth in claim 5 wherein said frusto conical recess has a progressively decreasing diameter inward from the top of said head, and wherein said tapered serrated portion of said shaft has a progressively decreasing diameter towards the threaded end of said shaft.

7. The windshield wiper organization set forth in claim 1 wherein the side walls of said frusto conical recess are smooth.

8. The windshield wiper organization set forth in claim 1 wherein the side walls of said frusto conical recess are serrated.

9. The windshield wiper organization set forth in claim 8 wherein the serrations on the side walls of said frusto conical recess are straight.

10. The windshield wiper organization set forth in claim 8 wherein the serrations on the side walls of said frusto conical recess are diamond shaped.

References Cited in the file of this patent

UNITED STATES PATENTS

| | | |
|---|---|---|
| 2,552,102 | Lyons | May 8, 1951 |
| 2,709,907 | Robertson et al. | June 7, 1955 |
| 2,753,886 | Powers | July 10, 1956 |

FOREIGN PATENTS

| | | |
|---|---|---|
| 614,204 | Great Britain | Dec. 10, 1948 |
| 439,479 | France | Apr. 10, 1912 |